United States Patent [19]

Fujimura

[11] 4,170,719
[45] Oct. 9, 1979

[54] SPEECH TRANSMISSION SYSTEM

[75] Inventor: Osamu Fujimura, New Providence, N.J.

[73] Assignee: Bell Telephone Laboratories, Incorporated, Murray Hill, N.J.

[21] Appl. No.: 915,371

[22] Filed: Jun. 14, 1978

[51] Int. Cl.² ............................................. H04B 1/66
[52] U.S. Cl. ............................................. 179/15.55 R
[58] Field of Search ................. 179/15.55 T, 15.55 R, 179/1 SA

[56] References Cited

U.S. PATENT DOCUMENTS

| 3,040,450 | 4/1962 | Schroeder | 179/15.55 R |
| 3,158,693 | 11/1964 | Flanagan | 179/15.55 R |
| 3,542,955 | 11/1970 | Flanagan | 179/1 SA |
| 3,875,341 | 4/1975 | Gassmann | 179/15.55 R |

OTHER PUBLICATIONS

"A Vocoder for Transmitting 10 K0/S Speech Over a 3.5 K0/S Channel," M. R. Schroeder et al., Monograph 3698, Bell Telephone System Technical Publications, Oct. 1960.

Primary Examiner—William C. Cooper
Attorney, Agent, or Firm—Joseph P. Kearns

[57] ABSTRACT

A speech transmission system is improved in intelligibility and naturalness by separating voiced from invoiced speech segments prior to application to a transmission channel of restricted bandwidth. Voiced segments are combined without processing with discrete-frequency coded unvoiced segments processed in analog or digital fashion conformably with the limited channel bandwidth at the transmitter. Voiced segments are reproduced conventionally while unvoiced segments are simulated by noise sources triggered by decoded discrete frequencies at the receiver. The reconstructed speech signal can thus occupy substantially more than the limited channel bandwidth.

12 Claims, 2 Drawing Figures

SPEECH TRANSMISSION SYSTEM

FIELD OF THE INVENTION

This invention relates to the transmission of human speech through channels of restricted bandwidth for the purpose of enhancing naturalness and intelligibility.

For over a hundred years the carbon microphone has imposed constraints on the sound quality of voice telephone transmission. In addition the standard telephone network is restricted in bandwidth to a range approximately 300 Hertz to 3500 Hertz. There is an expectation that such new sound transducers as the electret microphone will become an economical substitute for the carbon microphone and alleviate the former constraint. However, because of the large investment in voice transmission systems the latter constraint is unlikely to be removed in the near future.

According to widely accepted studies of human speech characteristics, the frequency range of human speech extends well beyond the range of telephone transmission channels. Human speech comprises both voiced segments, i.e., arising from vibrations of the vocal chords, and unvoiced (sometimes voiceless) segments i.e., arising from air traversing the oral and nasal cavities. Indeed, many speech sounds are compounded of voiced and unvoiced components. In general, voiced components provide adequate energy for intelligibility within the frequency range of standard telephone channels, but unvoiced components generate a considerable portion of their energy at frequencies lying above those of the telephone transmission band.

All vowel sounds are voiced. Many consonants, such as l, m, n and r are almost always voiced. A few vocal sounds, represented by v, th (as in the) and z, partake of both voiced and unvoiced components. The purely unvoiced speech sounds include f, s, and th (as in thin). It is the last-mentioned group of sounds that cause the most distinguishability problems in the telephone frequency band. On long-distance toll connections particularly are the problems of intelligibility and naturalness apparent.

The fricative consonant "s" is characterizable by an energy null at approximately 2500 Hz in the voice band and two resonances at about 4000 Hz and 8000 Hz above the voice band. The fricative "th" (as in "thin") possesses a similar null and two resonances near 5500 Hz and 8000 Hz. The fricative "f" shows no null within the voice band but exhibits two resonances at approximately 7000 Hz and 9000 Hz. Thus, the three consonant speech sounds are unambiguously distinguishable only in that part of their spectra lying beyond the telephone voice band. Ambiguity is usually manifested in attempting to spell names and recite initials over the telephone. Accordingly, the speech frequency bandwidth required to be accommodated for hissy sound segments, such as the fricatives "s" "f", and "th" is almost double the standard telephone voice frequency band.

Other fricatives are similarly characterizable as having a significant fraction of their sound energy outside the voice band. See in this connection the paper by J. M. Heinz and K. N. Stevens entitled "On the Properties of Voiceless Fricative Consonants" (*Journal of the Acoustical Society of America*, Vol. 33. No. 5, page 589, May 1961).

A previously known system for treating high-and low-frequency bands of human speech separately for bandwidth reduction purposes has been disclosed in U.S. Pat. No. 3,158,693 granted to J. L. Flanagan on Nov. 24, 1964 and entitled "Speech Interpolation Communication System". In that system high-band speech energy was interpolated into silent intervals of a low-band segment. While that system, intended primarily for bandwidth reduction, could potentially transmit high quality speech in a narrow-band channel; it required unduly complex apparatus for detecting silent intervals in the low-band segment, selectively translating high-band energy bursts into the low-band segment and synchronizing switching intervals between transmitter and receiver. The present invention is primarily directed to high-quality speech transmission and only secondarily to bandwidth reduction.

SUMMARY OF THE INVENTION

In accordance with this invention, a speech wave to be transmitted is split into voiced and unvoiced segments. The voiced (sometimes described as buzzy or hissless) segments are applied without any further processing to the transmission channel. The unvoiced (sometimes described as hissy) segments are monitored for the absence of significant energy within the voice band and the presence of energy at any of two or more discrete frequencies above the upper cutoff of the transmission band. In an illustrative embodiment the amplitude values of the chosen frequencies are modulated on carrier waves at a band edge of the transmission channel. These amplitude values define the spectrum of the speech wave at frequencies beyond the passband of the transmission channel. The coded unvoiced segments of the speech wave are then combined linearly with the unprocessed voiced segments in the transmission channel.

At the receiver for the transmitted speech wave the voiced and unvoiced speech segments are separated in accordance with their frequency components. The components encoding the out-of-band speech spectrum segments are remodulated to their original positions, shaped in accordance with the amplitude thereof and recombined with the voiced segments to reconstruct a double voiceband, or greater, frequency spectrum for application to a sound transducer.

Equivalent digital methods can also be employed to transmit digitized voiced speech segments without further processing time-multiplexed with reduced-speed samples of discrete frequencies defining the envelope of the unvoiced segments.

A speech transmission system in accordance with this invention is useful in telephony, speech analysis and speech synthesis.

BRIEF DESCRIPTION OF THE DRAWING

This invention will be described in accordance with the following drawings in which.

DETAILED DESCRIPTION

Figure 1:
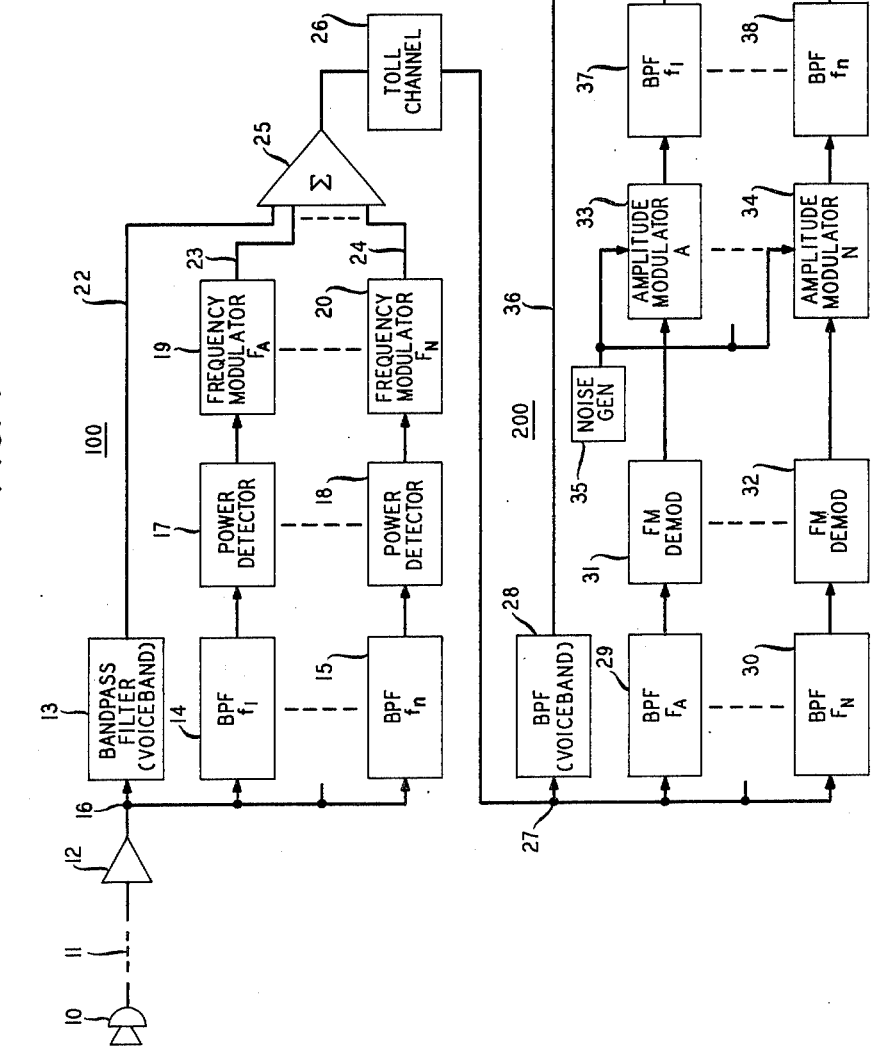
FIG. 1 is an illustrative embodiment of a high-fidelity speech transmission system according to this invention.

FIG. 1 is a block diagram of a speech transmission system of enhanced naturalness and intelligibility which transmits speech segments to approximately double the frequency bandwidth or greater of the available transmission channel. Voiced and unvoiced segments of human speech are separately treated such that intelligibility-relevent hissy segments outside the passband of the transmission channel are transmitted in encoded form between talker and listener.

The improved speech transmission system comprises a transmitter section 100 in the upper part of the FIG. 1, a receiver section 200 in the lower part and a transmission channel 26 connecting the transmitter section 100 to the receiver section 200.

The transmitter section comprises microphone 10; telephone subscriber loop 11; amplifier 12; junction 16; band-pass filter 13 covering the voice band; bandpass filters 14 and 15 for discrete out-of-band frequencies; power detectors 17 and 18; frequency modulators 19 and 20; connecting leads 22, 23 and 24 and combiner 25. Each of these elements taken individually is conventional in structure and function.

The receiver section comprises bandpass filter 28 convering the voice band; bandpass filters 29 and 30 covering the coded out-of-band frequencies; frequency demodulators 31 and 32; amplitude modulators 33 and 34; noise generator 35; bandpass filters 37 and 38 covering the discrete frequencies defining unvoiced speech segments; connecting leads 36, 39 and 40; combiner 41; subscriber loop 42 and sound transducer 43. Each of these elements is also conventional in structure and function.

The principal loss of speech quality occurs in toll transmission channels. Accordingly, only microphone 10 and transducer 43 would generally be located on customer premises, which are linked to telephone central offices over loops 11 and 42. The remaining apparatus shows in FIG. 1 (except for channel 26) would be located in central offices for reasons of economy and to facilitate shared use.

Transmission channel 26, which maintains a communication link whether by wire, radio or other medium between transmitting and receiving sections, is a standard voice telephone path typically restricted in bandwidth to the frequency range of 300 to 3000 Hz. These frequency limits are at the approximate half-power points so that neither upper nor lower cutoff is abrupt. It should be noted here that the spectrum of human speech extends well beyond this range. With respect to consonantal articulation of particular relevance to this invention there exists a sharp rise in energy level in the region around 3000 to 3500 Hz and a general reinforcement above 4000 Hz and extending to 8000 Hz or more. Consonantal sounds suffer most from lack of identifiability in regular telephone transmission.

Although vowel formants extend beyond the telephone voice band, their amplitudes often decrease rapidly with increase in frequency. Moreover, when there is significant energy in mid-voice range, the remaining higher frequencies do not generally aid in human perception of sound. Consequently, their identity and recognizability are well established within the available telephone bandwidth for vowels. Many consonants, such as, h, l, m, and r, are likewise fully understandable from components within the telephone band.

The fundamental principle of this invention is that of separate treatment of speech components within and without the standard telephone bandwidth. In implementation of this principle components within most of the telephone voice band are transmitted in unaltered form without special processing. In speech analysis terminology these components are the voiced or buzz components. The buzz is attributed to the impulsive nature of the vibration of the vocal chords. Components outside the telephone voice band are the unvoiced or hissy segments, i.e., turbulent noise, caused by passage of breath tones or air flow through constrictions in the oral cavity, or impulsive transient noise caused by abrupt vocal-tract movements. These latter components are approximated satisfactorily for human auditory capability by discrete numbers of selective narrow frequency bands, which can be encoded on frequencies within the telephone band that do not interfere with the transmission of voiced formants.

Figure 2:
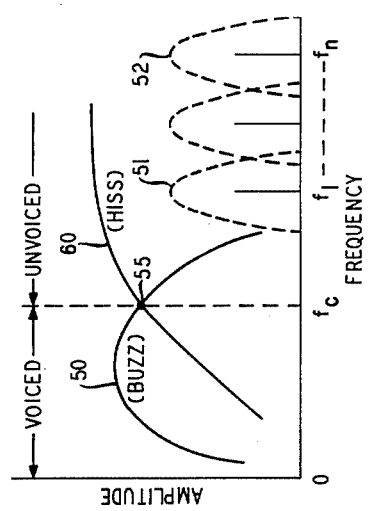
FIG. 2 is a frequency diagram of the dichotomy between voiced and unvoiced speech signal energy.

Even though the spectrum of unvoiced (aperiodic) sound segments statistically overlap most of the voiced (periodic) sounds considerably, there is a strong natural tendency for the former to contain the main portion of its energy in high frequencies above 3000 Hz, and the latter in energy below this frequency. If we design a pair of filters (curves 50 and 60), one high pass and another low pass, with this frequency as a common cut-off (crossover) frequency, as illustrated in FIG. 2, we can roughly separate the two types of sounds into two categories of time segments, one showing predominantly strong output energy at the output of the band-pass filter (curve 50), the other at the output of the high-pass filter (curve 60). Investigation shows that below crossover $f_c$ at point 55 of curves 50 and 60 in FIG. 2 the speech wave is largely periodic and above $f_c$ it is either largely aperiodic with the appearance of random noise, or in some cases physically periodic but nevertheless replaceable by random noise. Therefore, any fine structure at high frequencies can be simulated by random noise and only the gross spectral evelope of the high-frequency components, whether voiced or unvoiced need be transmitted. The spectrum can be effectively approximated by amplitude specifications for a relatively small number of discrete frequencies, such as $f_1$ through $f_n$ with frequency responses 51 and 52 in FIG. 2, lying above the crossover frequencies $f_c$. When there is significant energy in the voice band, frequencies above the voice band can be eliminated deliberately without affecting intelligibility.

The apparatus shown in FIG. 1 implements the separation principle of this invention in a straightforward analog fashion. Speech signals impinging on microphone 10, or equivalent speech transducer, such as, a telephone transmitter, are transformed into electrical waves which are carried over subscriber loop 11 and, if necessary, are amplified in amplifier 12 at the telephone central office. The amplified waves representing the full frequency range of human speech are incident at junction 16, from which they are branched among bandpass filters 13, 14 and 15. Bandpass filter 13 is designed to have the frequency $f_c$ as its nominal cut-off value. A low-frequency cut off is provided to leave frequency space as needed for coded high frequencies. Signals in the output of filter 13 appearing on lead 22 are equivalent to the voiced speech segment of the actual speech wave.

Bandpass filters 14 and 15 are representative of two or more such elements capable of isolating preselected discrete narrow frequency bands $f_1 \ldots f_n$ in the unvoiced speech spectrum. For the simplest case of two defining frequencies, center frequencies of 3500 and 5500 Hz are found to be good compromise values. The amplitudes of the selected frequency bands are monitored in power detectors 17 and 18 and voltages representing these amplitudes modulate the frequency of a sinusoidal waveform in modulators 19 and 20 to the vicinity of the lower band edge (below 300 Hz) of the telephone voice band. Frequency modulation is employed to avoid as much as possible any interference with amplitudes of the voiced speech segments. Alternatively, the frequency-modulated tones can be translated to the upper band-edge (3000 to 3500 Hz) of the telephone voice band. In this case, the voice band signal would be more sharply cut off at both transmitter and receiver than shown in FIG. 2.

The power amplitude of the frequency component selected by bandpass filter 14, for example, is obtained in power detector 17 and frequency modulated to the telephone channel band edge in frequency modulator 19 to produce an output on lead 23.

Similarly the power amplitude of the frequency component selected by bandpass filter 15 is obtained in power detector 18 and frequency modulated to the telephone channel band edge in frequency modulator 20 to produce an output on lead 24.

The outputs on leads 23 and 24 are modulated with nearby, but different, frequencies on an edge of the telephone voiceband. Other preselected frequencies are similarly processed as necessary.

The voiced segment on lead 22 is combined in summation circuit 25, advantageously embodied in an operational amplifier, with the frequency-modulated tones on leads 23 and 24 to form a composite line signal entirely confined within the telephone voice band for application to transmission channel 26.

Transmission channel 26 is understood to comprise conventional telephone switching and transmission equipment. Actual frequencies employed in channel 26 can be at baseband (without any carrier frequency) or passband (with a carrier frequency) and the channel can include in any combination wire, radio or other links.

The received signal is incident at junction 27 in FIG. 1. Voiced segments are stripped from the incoming signal by bandpass filter 28, which has a lower cutoff above the frequency-modulated tones encoding the unvoiced segments. The voiced segments are delivered by way of lead 36 to combiner 42 without further processing. The frequency-modulated tones, on the other hand, are picked from junction 27 in the bandpass filters 29 and 30 shown, and in such other similar filters as may be required by the selected coding. The tones are demodulated and translated back to a frequency range above frequency $f_c$ in frequency demodulators 31 and 32. Since the unvoiced segment resembles random noise the encoding tones are shaped in amplitude modulators 33 and 34 to simulate the full unvoiced spectrum with the aid of noise generator 35. Amplitude modulators 33 and 34 control the levels of the random noise applied to bandpass filters 37 and 38, whereby a full speech spectrum is reconstructed. The outputs of modulators 33 and 34 on leads 39 and 40 are combined in combiner 41 with the voiced segments on lead 36 into a speech spectrum which is about twice that of transmission channel 26 and includes actual voiced speech segments and simulated unvoiced speech segments. The composite wave is amplified as necessary, by means not shown, and drives loudspeaking transducer or earphone 43 for audible reproduction of natural-sounding, high-quality speech.

While the principle of this invention has been described in terms of a particular analog embodiment, it will be understood that digital equivalents both with and without compression are well within the skill of the art. In the case of digital transmission, the coding of high-frequency amplitudes can be implemented in different ways, other than frequency or amplitude modulation of sinusoidal waveforms, with appropriate protection against transmission errors.

I claim:

1. A system (FIG. 1) for transmitting speech signals having voiced components substantially confined to one frequency range and unvoiced components with substantial energy in another frequency range over a transmission channel (26) with bandwidth embracing only the one frequency range, there being a complementary transmitter (100) and receiver (200) at opposite channel terminals CHARACTERIZED IN THAT at the transmitter terminal (100)

voiced components are separated by selective filtration (13) from unvoiced components of a speech signal to be transmitted, power levels of two or more discrete frequencies in the unvoiced component are detected by further selective filtration (14, 15) in the other frequency range and amplitude components proportional to such power levels are modulated (19,20) to a band edge of the one frequency range, and a composite signal constituted of unprocessed speech components in the one frequency range and said amplitude components measured at such discrete frequencies in the other frequency range after translation to a band edge of the one frequency range is applied to the limited bandwidth transmission channel (26); and at the receiver terminal (200)

unvoiced speech components in the other frequency range are reconstructed by modulating the output of an independent noise generator (35) in accordance with the amplitude (33,34) of components corresponding to discrete frequencies selected by filtration (29,30) and restored to the other frequency range (31,32) at the band edge of the one frequency range in a received composite signal, and unprocessed voice speech components separated by selective filtration (28) in the received composite signal in the one frequency range are combined (41) with simulated unvoiced components excited in the other frequency range to reconstitute a speech signal with enhanced naturalness and intelligibility spanning both the one and the other frequency ranges.

2. The speech transmission system according to claim 1 further CHARACTERIZED IN THAT:

voiced components of the speech signals to be transmitted are separated from unvoiced components therein in accordance with their frequency content below and above a predetermined cutoff frequency for a filter (13), voiced components lying within the passband of such filter and unvoiced components having significant energy outside the passband of such filter.

3. The speech transmission system according to claim 1 further CHARACTERIZED IN THAT:

the two or more discrete frequencies among the unvoiced components are selected by means of bandpass filters (14,15).

4. The speech transmission system according to claim 1 further CHARACTERIZED IN THAT:

the amplitude components representing two or more discrete frequencies among the unvoiced components are frequency modulated (19,20) onto carrier waves located at a band edge of the voice frequency spectrum.

5. The speech transmission system according to claims 1 or 4 further CHARACTERIZED IN THAT
an unprocessed voiced speech segment is combined in a summation circuit (25) with coded representations of energy levels at discrete frequencies in the unvoiced speech segment translated to a band edge of the bandwidth of the transmission channel (26).

6. The speech transmission system according to claim 5 further CHARACTERIZED IN THAT
power levels of discrete preselected frequencies in an unvoiced speech segment are translated from outside to within the transmission bandwidth of the transmission channel (26) by means of one or more frequency modulators (19,20).

7. The speech transmission system according to claim 1 CHARACTERIZED IN THAT
the received composite signal at a receiver terminal (200) is separated into an unprocessed voiced segment in a first band-pass filter (28) and into discrete coded frequencies representing energy levels in an unvoiced segment by means of further bandpass filters (29,30).

8. The speech transmission system according to claim 1 CHARACTERIZED IN THAT
the noise generator (35) from which a natural sounding unvoiced speech segment is reconstructed has its output modulated through amplitude modulators (33,34) under the control of discrete frequency components decoded by frequency demodulators (31,32) and translated to the frequency range of the unvoiced speech segment by means of band-pass filters (37,38).

9. The speech transmission system according to claim 1 CHARACTERIZED IN THAT
at the receiver terminal (200) an unprocessed voiced speech segment recovered from the received composite signal is combined in a summation circuit (41) with simulated unvoiced components derived from energy levels measured at discrete frequencies retranslated to a frequency range above that of the transmission channel (26) to form a natural-sounding speech signal for application to a sound transducer (43).

10. The transmission terminal (100) for a speech transmission channel (FIG. 1) having a restricted transmission bandwidth CHARACTERIZED IN THAT
voiced and unvoiced segments in a speech signal having a bandwidth on the order of twice that of such channel before transmission are separated by a filter (13) from each other,
unvoiced speech segments are monitored in frequency by further filters (14, 15) and in power level by detectors (17, 18) at two or more discrete frequencies,
the power levels of such discrete frequencies are translated in modulators (19, 20) within the restricted transmission bandwidth, and
the unprocessed voiced segment and the modulated discrete frequencies from the unvoiced segment are combined in a summation circuit (25) into a composite line signal for application to the transmission channel (26).

11. The receiver terminal (200) in a speech transmission system (FIG. 1) having a restricted transmission bandwidth for accepting an unprocessed voice segment and a coded unvoiced segment of a speech signal inherently possessing a bandwidth significantly exceeding that of such channel CHARACTERIZED IN THAT
unvoiced speech components in a received composite signal are reconstructed in a frequency range above such restricted bandwidth by modulating the output of an independent noise generator (35) by means of amplitude modulators (33,34) in accordance with the power level of coded discrete frequencies to form a simulated unvoiced segment.

12. The receiver terminal (200) for a speech transmission system (FIG. 1) in accordance with claim 11 CHARACTERIZED IN THAT
an unprocessed voiced speech segment recovered from a received composite signal is combined in a summation circuit (41) with the simulated unvoiced segment to form a natural sounding speech signal for application to a sound transducer (43).

* * * * *